June 25, 1963 W. D. REEVES 3,094,740
POULTRY SCALDING TANK WITH AIR AGITATING MEANS
Filed July 25, 1961 3 Sheets-Sheet 1

Willard D. Reeves
INVENTOR.

BY *Clarence A. O'Brien*
*and Harvey B. Jacobson*
Attorneys

June 25, 1963     W. D. REEVES     3,094,740
POULTRY SCALDING TANK WITH AIR AGITATING MEANS
Filed July 25, 1961     3 Sheets-Sheet 2
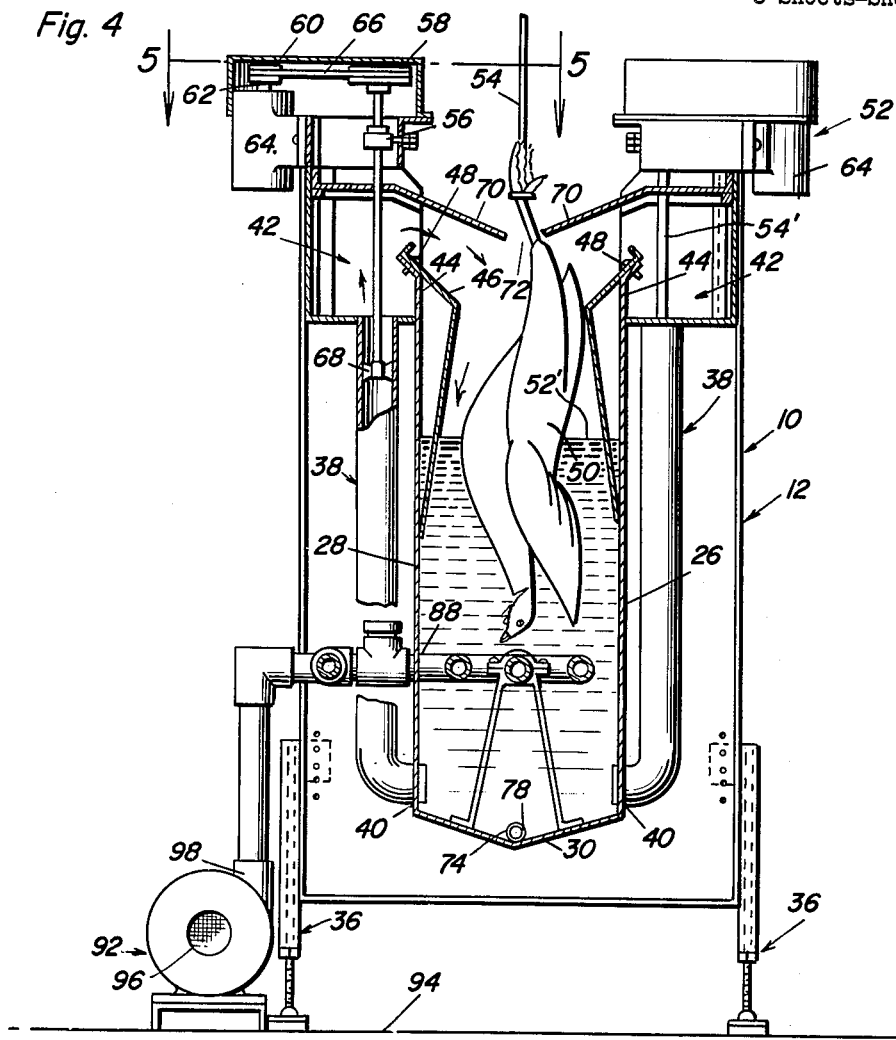
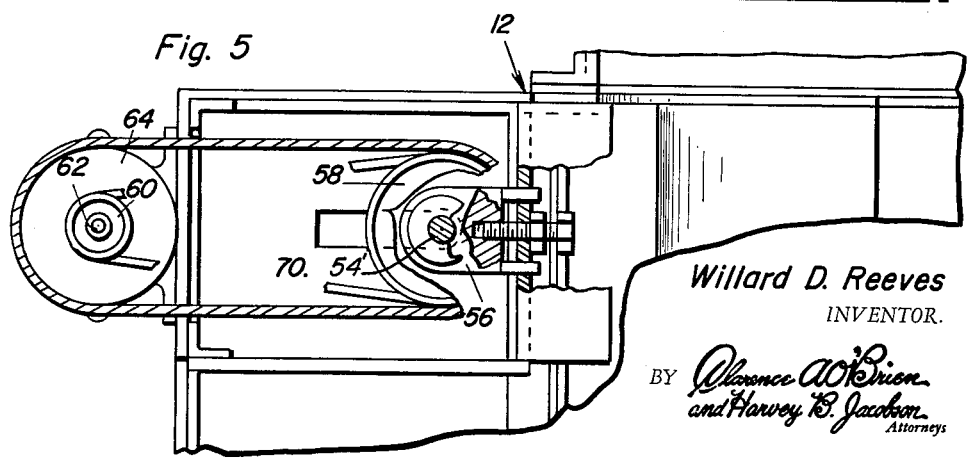
Willard D. Reeves
INVENTOR.

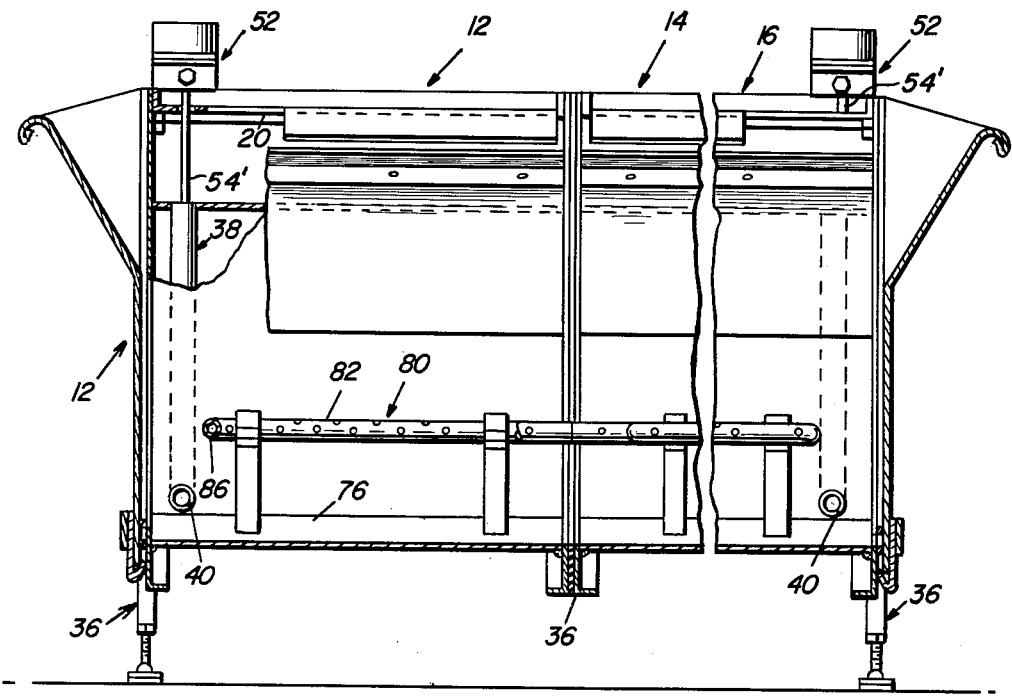
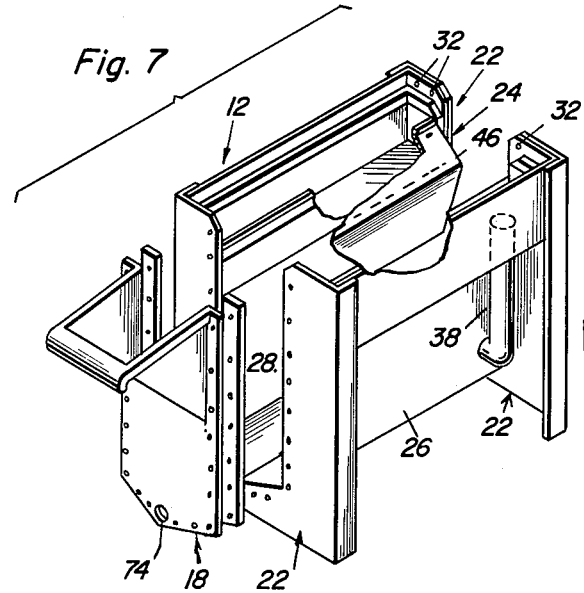
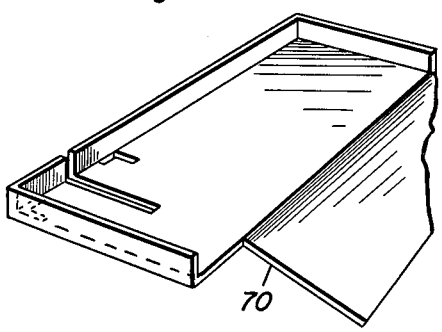
Willard D. Reeves
INVENTOR.

United States Patent Office 3,094,740
Patented June 25, 1963

3,094,740
POULTRY SCALDING TANK WITH AIR
AGITATING MEANS
Willard D. Reeves, Center, Tex., assignor of fifty percent
to St. Elmo Cross, Center, Tex.
Filed July 25, 1961, Ser. No. 126,584
6 Claims. (Cl. 17—11.2)

This invention relates to a novel and useful type of poultry scalding tank and more specifically to a poultry scalding tank provided with means for agitating the hot fluid in a poultry scalding tank by bubbling air upwardly through the fluid through which the fowl are moved during the scalding process.

In the past, it has been found that by scalding poultry the feathers may be more readily removed therefrom. However, previous poultry scalding tanks have been provided with opposite side walls between which fowl may be suspended and moved longitudinally of the tank. Hot liquid such as water is disposed in these conventional types of poultry scalding tanks and means is provided for circulating the hot liquid by pumping the liquid in the tank upwardly to a point above the liquid level of the tank and discharging the pumped liquid downwardly over the fowl suspended in the tank. The fowl suspended in the tank are usually in an inverted position whereby the recirculated water being discharged downwardly will readily penetrate the feathers of the fowl and more completely condition fowl so that their feathers may be more readily removed.

While these previous attempts in providing scalding tanks for fowl have been successful, fairly recent and stringent inspection rules have necessitated that excessively hot water be utilized in poultry scalding tanks in order to clean the birds or fowl well enough to pass inspection. This over scalding of fowl results in a non-uniform bloom and color of the fowl and greatly reduces the shelf-life of the dressed fowl. Accordingly, a need has arisen for providing a means of more thoroughly scalding poultry without using excessively hot water.

The main object of this invention is to provide a poultry scalding tank which may be of conventional design but which is supplemented with water agitating means for thoroughly agitating the water in which the inverted fowl is disposed. The water agitating means will therefore allow deeper penetration of the hot water to the skin of the fowl and about the base of its feathers and more completely and efficiently prepare and clean the fowl without over-scalding the latter.

A further object of this invention, in accordance with the immediately preceding object, is to provide air pump means for agitating the water of the scalding tank having discharge means disposed in the lower portion of the scalding tank and provided with upwardly opening discharge means whereby air may be bubbled upwardly through the liquid disposed in the scalding tank to assist in insuring that the hot fluid in the tank will penetrate to the skin of the fowl and around the base of the feathers of the fowl.

A further object of this invention, in accordance with the preceding objects, is to provide air pump means of a high volume and low pressure type whereby relatively large quantities of air may be bubbled upwardly through the hot water in a scalding tank without the discharge of air forming excessive voids in the hot water in the tank.

Still another object of this invention is to provide air pump means in accordance with the preceding objects having discharge means for discharging air upwardly through the liquid in a poultry scalding tank in areas spaced longitudinally of the tank whereby the fowl being scalded may move from areas of air agitated water to areas of water which is not air agitated and then back into areas of water which are air agitated.

A final object to be specifically enumerated herein is to provide a poultry scalding tank with air agitating means in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a somewhat enlarged vertical transverse sectional view taken substantially upon the plane indicated by section line 4—4 of FIGURE 2;

FIGURE 5 is a fragmentary enlarged horizontal sectional view taken substantially upon a plane indicated by section line 5—5 of FIGURE 4;

FIGURE 6 is a longitudinal vertical sectional view taken substantially upon the plane indicated by section line 6—6 of FIGURE 1 on somewhat of an enlarged scale and with parts of the poultry scalding tank being removed;

FIGURE 7 is an exploded perspective view of one end portion of the poultry scalding tank;

FIGURE 8 is an enlarged perspective view of one of the upper deflector panels of the scalding tank utilized to at least partially contain the heat of the heated liquid within the scalding tank;

Figure 1:
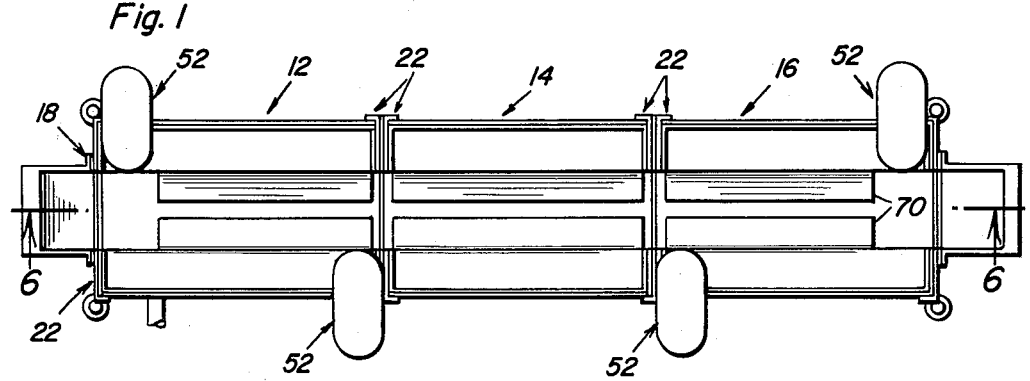
FIGURE 1 is a top plan view of a poultry scalding tank with the air agitating means of the instant invention operatively associated therewith and having parts thereof broken away.

Referring now more specifically to the drawings the numeral 10 generally designates a more or less conventional poultry scalding tank which includes a plurality of longitudinally aligned tank sections generally referred to by the reference numerals 12, 14 and 16. It is to be noted that while three tank sections have been illustrated, any number of tank sections may be utilized as desired. Each of the tank sections 12 and 16 is substantially identical inasmuch as they each include an end wall assembly generally referred to by the reference numeral 18 and a poultry chute assembly generally referred to by the reference numeral 20.

The ends of the tank sections 12 and 16 remote from the end wall assemblies 18 are each provided with a partial end wall assembly generally referred to by the reference numeral 22 which defines an upwardly opening notch generally referred to by the reference numeral 24. The opposite ends of the intermediate tank section 14 includes a pair of opposite end partial wall assemblies 22 and thus any number of intermediate tank sections 14 may be secured between the end sections 12 and 16. In addition, the end tank sections 12 and 16 may be secured together by omitting intermediate tank sections and it is further to be noted that a single tank section could be utilized if both of the opposite ends thereof were provided with end wall assemblies 18.

Each of the tank sections include opposite side walls 26 and 28 and a bottom wall 30.

With attention now directed to FIGURES 6 and 7 of the drawings it will be noted that the partial end wall assemblies 22 are suitably apertured as at 32 adjacent the notch 24 and that adjacent partial end wall assemblies 22 may be secured together to longitudinally align the corresponding tank sections by securing a resilient gasket 36' between adjacent partial end wall assemblies 22 with fasteners (not shown) secured through corresponding apertures 32 of the partial end wall assemblies 22.

The end wall assemblies 18 may be secured to the corresponding partial end wall assemblies 22 in any convenient manner such as by fasteners 34 secured in and through the apertured end wall 18 and the corresponding partial end wall 22.

The opposite ends of the tank assembly 10 are provided with suitable support leg assemblies generally referred to by the reference numerals 36 and it will be noted that each tank section includes a pair of recirculating and generally J-shaped water conduits 38. Each of the J-shaped water conduits 38 is inturned at its lower end and secured through the corresponding side wall of the associated tank section as at 40. It will be noted that the water conduit 38 of each tank section is disposed on opposite sides of the tank and that the upper end of each of the water conduits 38 opens into a water manifold chamber generally referred to by the reference numeral 42. The water manifold chambers 42 each includes an overflow lip 44 which is formed as part of the corresponding side wall of the tank section. An inwardly and downwardly inclined baffle wall 46 is secured to each overflow lip 44 by means of fasteners 48 and is adapted to direct the overflow of water from the water manifold chambers inwardly and downwardly over the inverted fowl 50 which is suspended in the hot water 52' within each tank section by means of suitable suspension means 54.

Secured to each of the end wall assemblies of the tank sections 12 and 16 is a water pump assembly generally referred to by the reference numeral 52. Each water pump assembly 52 includes a turbine shaft 54' journalled for rotation about a vertical axis by means of a bearing journal 56 and provided with a driven pulley 58 at its upper end which is aligned with a driving pulley 60 mounted on the output shaft 62 of an associated motor 64. The driven and driving pulleys 58 and 60 are operatively connected by means of an endless flexible belt 66. The bottom end of the turbine shaft 54' has a turbine wheel 68 secured thereto and the lower end portion of each turbine shaft 54' is disposed in the upper end of the corresponding water conduit 38. Thus, upon rotation of the turbine shafts 54', hot water from the bottom of the corresponding tank section is drawn inwardly through the lower ends of the water conduits 38 and upwardly through the latter and into the water manifold chambers 42. Then, as the water level in the water manifold chambers 42 rises, water will flow over the overflow lip 44 and downwardly and over the baffle wall 46 and onto the fowl 50.

It will be noted that a deflector panel 70 is carried by each of the opposite sides of each tank section and that the deflector panels project inwardly and downwardly from opposite sides of the tank sections and define a throat area 72 which extends longitudinally of the scalding tank 10 and is adapted to provide a means whereby the poultry 50 may be suspended within the tank 10 and between the side walls 26 and 28 thereof.

The end wall assemblies 18 and the partial end wall assemblies 22 are each apertured at their lower ends as at 74 and a closed steam line 76 extends through the apertures 74 and longitudinally of the scalding tank 10 and is utilized to heat the water therein to the proper temperature for scalding the fowl 50.

Figure 2:
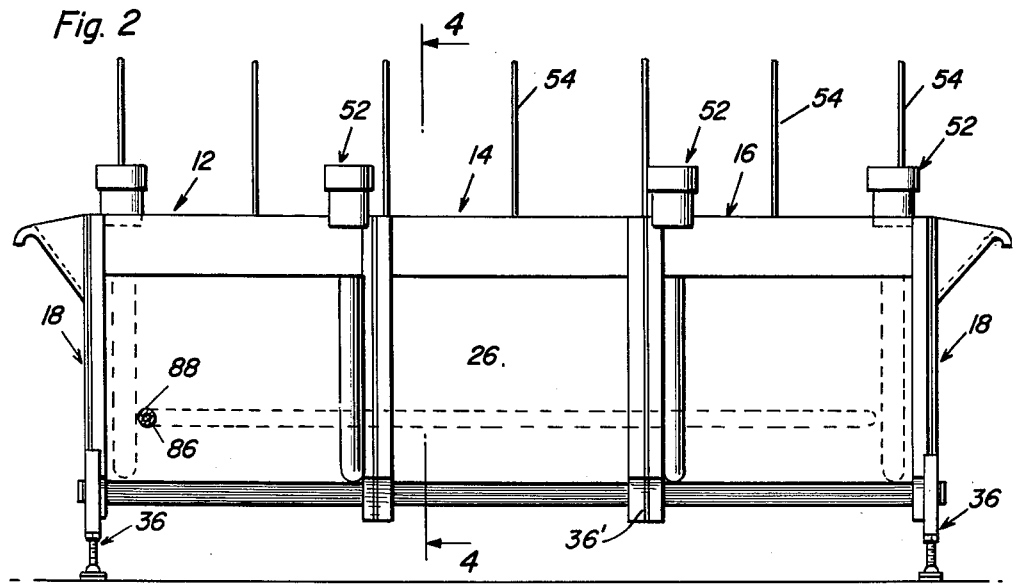
FIGURE 2 is a side elevational view of the embodiment illustrated in FIGURE 1.
Figure 3:
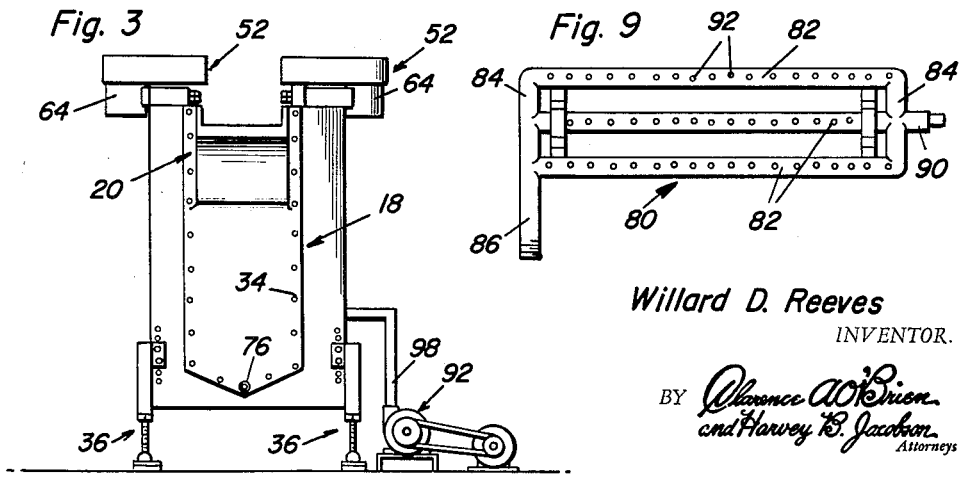
FIGURE 3 is an end elevational view of the embodiment illustrated in FIGURE 2 as seen from the left side of FIGURE 2.
Figure 9:
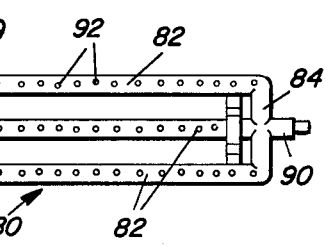
FIGURE 9 is a top plan view of one of the air discharge manifold members utilized to discharge high volumes of air at low pressure upwardly through the hot liquid in the scalding tank.

With attention now directed to FIGURES 2, 4, 6 and 9, there will be seen that a plurality of manifold members generally designated by the reference numeral 80 are disposed in the lower portions of the tank sections 12, 14 and 16. Each of the manifold members includes a plurality of elongated and generally parallel branch conduits 82 and these branch conduits 82 are connected at opposite ends by means of transverse conduits 84. The manifold member 80 disposed in the tank section 12 includes an air inlet pipe 86 on one end which is secured through the side wall 28 as at 88. The other end of the manifold member 80 includes a connecting conduit 90 which is adapted for connection with a similar connecting conduit (not shown) carried by the similar manifold member 80 disposed in the tank section 14. In a similar manner, the end of the manifold member 80 disposed in the tank section 14 and remote from the tank section 12 is connected to the adjacent end of the manifold member 80 disposed in the tank section 16. The end of the manifold member 80 disposed in the tank section 16 and remote from the tank section 12 has a sustantially close transverse conduit 84 and thus all of the air entering the inlet 86 must pass upwardly and out of the outlet openings 92 formed in the branch conduits 82 of the manifold members 80.

A blower assembly generally referred to by the reference numeral 92' may be mounted on the scalding tank 10 or supported from the supporting surface 94 with which the leg assemblies 36 are engaged and the blower assembly 92' includes an inlet 96 and an outlet 98 which is operatively connected to the inlet 86 of the manifold member 80 disposed in the tank section 12.

In operation, the fowl 50 are moved longitudinally of the scalding tank through the throat 22 defined between adjacent free end edges of the deflector panels 70. As the fowl 50 moves through the tank section 12, air will be discharged upwardly from the manifold member 80 disposed therein whereupon the air bubbling up through the heated water 52 will vigorously agitate the water and thereby enable the water to penetrate to the base of the feathers of the fowl 50. The tank section 12 is provided with water recirculating means whereas the tank section 14 is provided only with a manifold member 80 for bubbling air upwardly through the water in the intermediate tank section 14. However, as the fowl moves into the tank section 16, the tank section 16 is provided with water recirculating means and therefore the process carried out in tank section 12 will again be repeated in tank section 16. In addition, the intermediate tank section 14 could have its manifold member 80 replaced by a non-perforated connecting conduit between the manifold member 80 disposed in the section 12 and the manifold member disposed in the tank section 16. In this manner, the fowl 50 passing through the scalding tank 10 may be subjected to air agitated water at points spaced longitudinally along the scalding tank 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a poultry scalding tank of the type including opposite side walls each having an interior and exterior face and in which a fowl is suspended in hot liquid disposed between said interior faces, means mounted on the exterior face of each of said side walls and having an inlet portion extending through said side walls into said liquid for recirculating said hot liquid disposed in said tank between the interior faces of said side walls by pumping the liquid between said interior faces of said side walls upwardly to a point above the liquid level in said tank and discharging the pumped liquid downwardly over the suspended fowl, liquid agitating means in addition to said liquid recirculating means including air pump means having discharge manifold means operatively associated therewith mounted in the lower portion of said tank between the interior faces of said opposite side walls above the inlet portions of said recirculating means but below the liquid level therein for bubbling air upwardly through said liquid against the normal flow of circulating liquid to agitate the liquid in contact with said suspended fowl.

2. The combination of claim 1 wherein said air pump means is of a high volume low pressure type.

3. The combination of claim 1 wherein said discharge manifold means includes an elongated substantially closed manifold member having a plurality of upwardly opening outlet openings formed therein.

4. The combination of claim 3 wherein said manifold member includes air inlet means secured through a portion of a side wall of said tank.

5. The combination of claim 4 wherein said air pump means is mounted adjacent the exterior of said tank and includes an air outlet operatively connected with the air inlet means of said manifold member.

6. The combination of claim 5 wherein said air pump means is of a high volume low pressure type.

References Cited in the file of this patent

UNITED STATES PATENTS

| | | |
|---|---|---|
| 2,649,615 | Sharp | Aug. 25, 1953 |
| 2,891,561 | Hagans | June 23, 1959 |
| 2,994,909 | Ray | Aug. 8, 1961 |